Sept. 23, 1930.  W. C. SANDERS  1,776,272
RAILWAY CAR AXLE CONSTRUCTION
Filed April 18, 1928  2 Sheets-Sheet 1
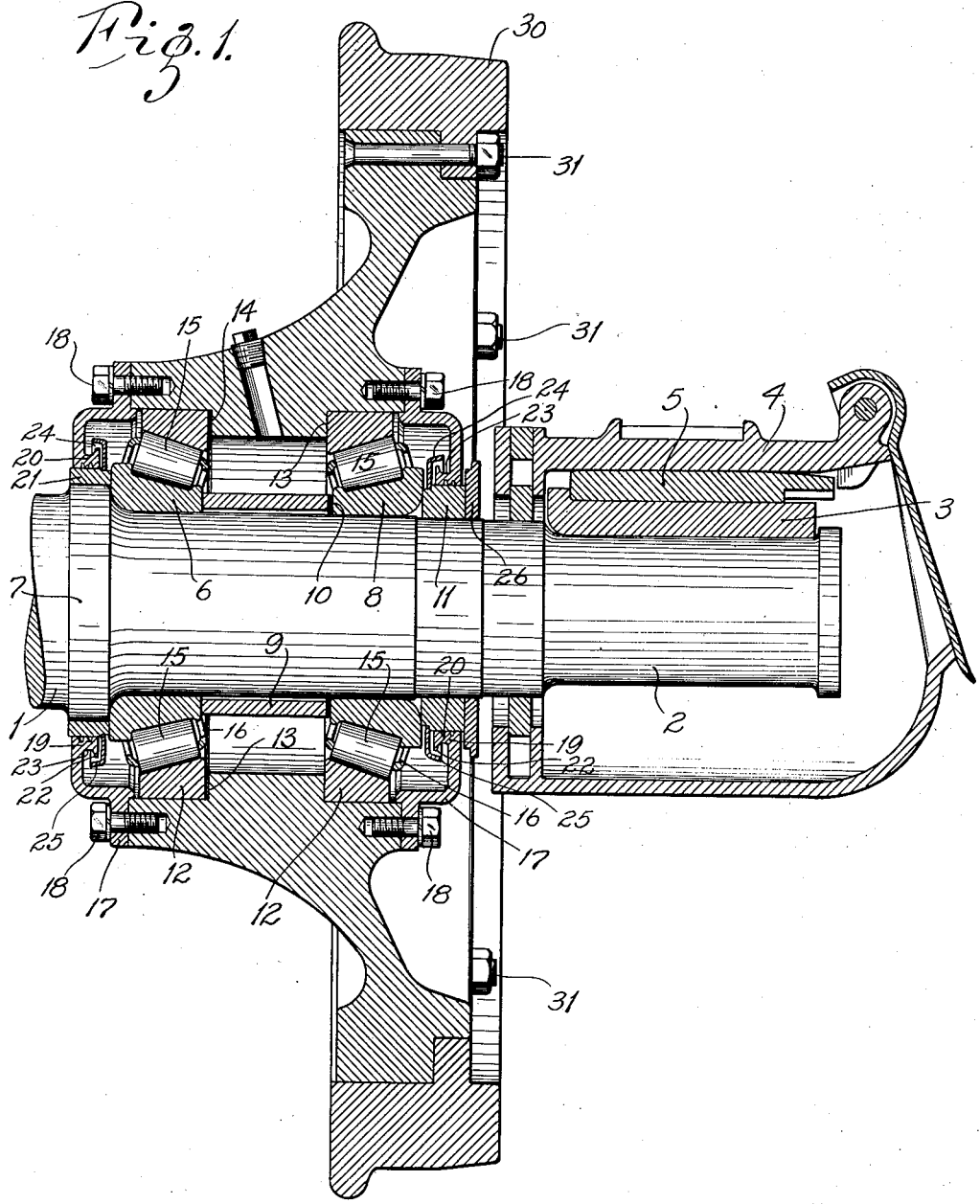

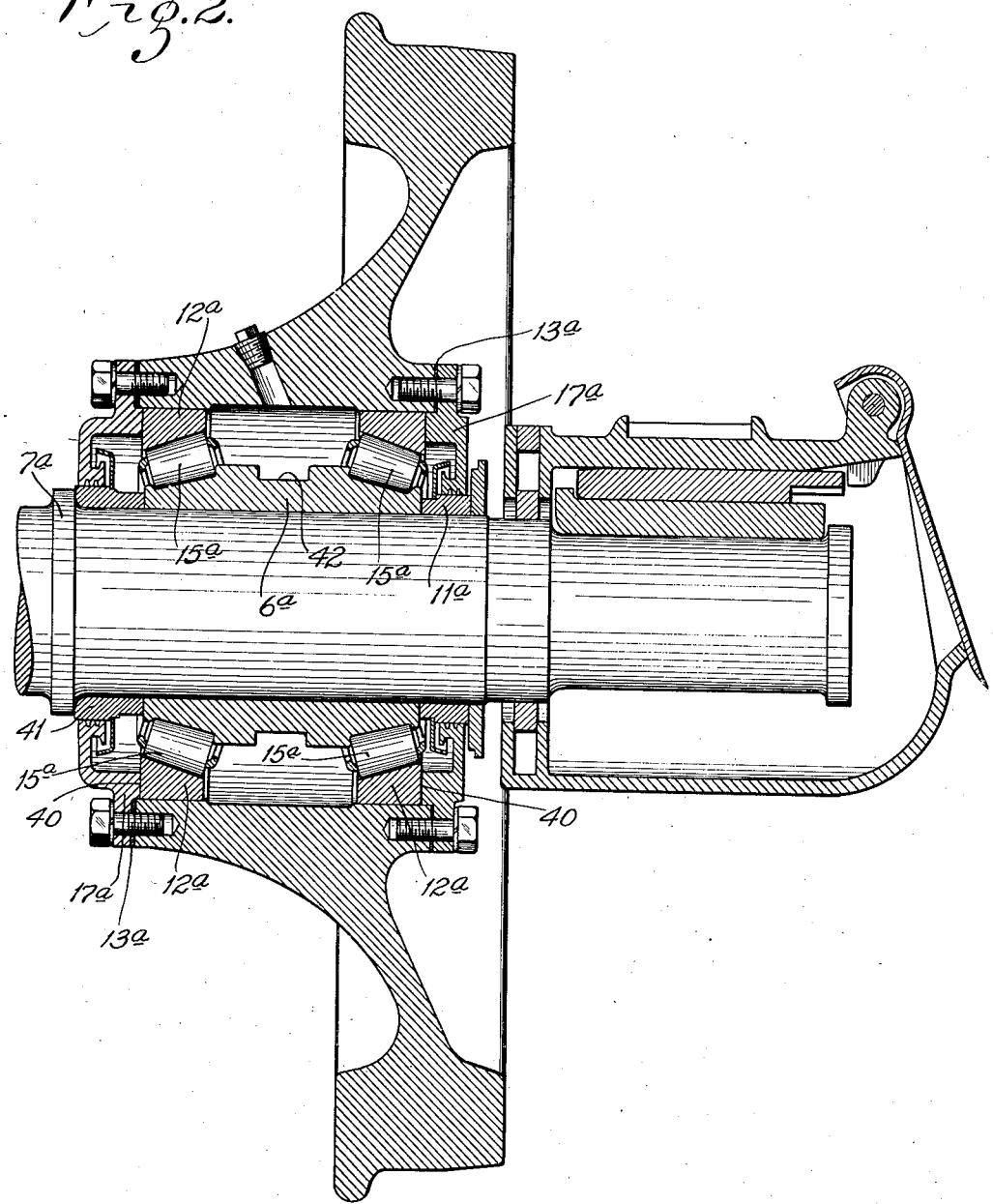

Patented Sept. 23, 1930

1,776,272

UNITED STATES PATENT OFFICE

WALTER C. SANDERS, OF CANTON, OHIO, ASSIGNOR TO THE TIMKEN ROLLER BEARING COMPANY, OF CANTON, OHIO, A CORPORATION OF OHIO

RAILWAY-CAR-AXLE CONSTRUCTION

Application filed April 18, 1928. Serial No. 271,029.

My invention relates to railway car axles and has for its principal object a construction in which antifriction bearings are interposed between the axle and the hubs of the wheel and which is interchangeable with present standard axles in which the axles are mounted in plain journal bearings. Further objects are to provide adequate lubrication for the bearings, to protect the bearing enclosure from shocks and to permit easy removal of the antifriction bearings. The invention consists in the railway car axle and in the parts and combinations and arrangements of parts hereinafter described and claimed.

In the accompanying drawing,

Fig. 1 is a longitudinal sectional view of a railway car axle construction embodying my invention, and Fig. 2 is a similar view of a modification of the invention.

Railway car axles at present in use have their end portions mounted in brasses or journal bearings that are mounted in journal boxes. Antifriction bearings cannot be used in these journal boxes; and a very important obstacle to the use of antifriction bearings has been the necessity of discarding the present standard journal boxes and making other radical changes in the present standard axle construction. The present invention makes it possible to use the present standard journal box and plain bearing construction, the antifriction bearings being mounted between the axle and the hubs of the wheels.

The drawing illustrates a railway car axle 1 having each end portion 2 reduced and mounted in a brass 3 or journal bearing in a journal box 4, a bearing wedge 5 being interposed between the brass and the box. This construction is the present standard car axle bearing construction.

The axle 1 has portions inwardly of the reduced journal portions on which are mounted antifriction bearings for the hubs of hollow wheels, taper roller bearings being illustrated and preferred. At each end of the axle, the large end of a bearing cone 6 is disposed against a shoulder 7 on the axle. Spaced from said cone 6 is another bearing cone 8 with its small end disposed inwardly. Interposed between the two cones is a sleeve 9. Said sleeve 9 is preferably of slightly larger diameter than the axle. Interposed between said sleeve 9 and the outermost bearing cone 8 are shims 10. Adjacent to the outermost bearing cone 8 is a slightly reduced portion of the axle on which is shrunk a ring 11 that abuts against the outermost bearing cone 8. Said ring 11 helps maintain the adjustment of the bearings which are tight on axle. In order to change the adjustment of the bearings it is necessary to remove the outer cone and ring 11 and add or take away shims 10.

The bearing cups 12 are mounted in the hub of the wheel against shoulders 13 therein, shims 14 being preferably interposed between the innermost bearing cup and its abutment shoulder 13. Conical rollers 15 are interposed between the respective cups and cones, said rollers being mounted in cages 16.

The wheel hub is closed by means of rings 17 that are secured to the wheel as by cap screws 18. Said rings 17 have tubular portions 19 that project inwardly and have their inner peripheries 20 grooved. The innermost ring 17 fits closely around a collar 21 mounted on the axle shoulder 7 and the outermost ring 17 fits closely around the bearing securing ring 11 at the outer end of the axle. Each closure ring 17 has an annular ring 22 at the inner edge of the tubular portion 19, whereby an annular channel 23 is formed around the outer periphery of the tubular portion of each closure ring between said rib and the end wall of the ring. Secured, preferably by welding, to the collar 21 and to the bearing securing ring 11, respectively, are washers 24 that have flaring peripheral portions 25 that overhang the annular channels 23 of the closure rings 17. Abutting against the bearing securing ring 11 is a collar 26 of considerably larger diameter than the ring, said collar being tight on the axle as by being shrunk thereon. Said collar protects the bearing closure from contact with the journal box 4 in the event of relative longitudinal movement as between the car axle or wheel and the journal box.

The wheel may be provided with a separate tire portion 30 shown in the upper part of the sectional portion of the drawing, such tire portion being secured to the body of the wheel as by bolts 31.

Fig. 2 shows a modified form of the invention in which the bearing rollers 15$^a$ are disposed with their large ends inwardly. The bearing cups 12$^a$ are mounted in the wheel hub and are held in position by means of projecting ribs 40 on the closure rings 17$^a$. Adjustment of the bearing cups is by means of shims 13$^a$ interposed between one or both closure rings 17$^a$ and the wheel. In the drawing a single bearing cone 6$^a$ is illustrated, said cone having an elongated middle or body portion, the inner end of said cone abuts against a ring 41 that abuts the shoulder 7$^a$ of the axle. The outer end of the cone 6$^a$ is engaged by a ring 11$^a$ that is tight on the axle. The middle of said cone may be provided with a peripheral groove 42 adapted to receive a tool for removing the bearing cone from the axle.

The foregoing construction is interchangeable with the present standard railway car axles and may be substituted for the axles of railway cars now in use. The closures at the ends of the bearings adequately protect against entry of dirt and against escape of oil from the enclosure. The collar on the axle shoulder facilitates the removal of the bearings by stripping them from the axle. The outer bearing closure ring is protected from contact with the journal box. Differential movement of the wheels is permitted. The plain bearing permits creeping of the axle, thus distributing the wear on the bearing cones.

What I claim is:

1. A railway car axle construction comprising a journal box, an axle having a reduced end portion extending into said journal box, a journal bearing on said reduced portion of said axle, a hollow wheel on said axle adjacent to said journal box, the hub of said wheel having counterbored end portions and shoulders at the inner ends of said counterbored portions, conical bearing cups in said counterbored portions abutting against said shoulders, bearing cones for said cups on said axle, conical bearing rollers between said cups and cones, a shoulder on said axle against which the innermost bearing cone abuts, a collar on said shoulder, a spacing sleeve mounted loosely on said axle between said bearing cones, a ring tight on said axle and abutting against the outermost bearing cone, end closure rings secured at the ends of the wheel hubs and closely encircling said ring and said collar on said shoulder, each closure ring having an inwardly extending tubular portion, an outwardly projecting annular rib at the end of said tubular portion and washers welded to said collar and to said ring respectively, said washers having flaring portions overhanging the channels formed between the ribs and end walls of said closure rings.

2. In combination, a hollow wheel, an axle extending therethrough, an antifriction bearing interposed between said wheel and axle, closure rings secured to said wheel, said closure rings having tubular portions extending inwardly, the tubular portion of each closure ring having an outwardly projecting annular rib at its inner end and washers mounted to turn with said axle, said washers having flaring portions that overhang the channels formed between said ribs and the ends walls of said closure rings.

Signed at Canton, Ohio, this 3rd day of April, 1928.

WALTER C. SANDERS.